United States Patent
Midkiff et al.

(10) Patent No.: US 8,297,699 B1
(45) Date of Patent: Oct. 30, 2012

(54) MOUNTABLE FISHERMAN'S CHAIR

(76) Inventors: Thomas Midkiff, Destin, FL (US); John R. Tolbert, Sr., Lynn Haven, FL (US); John R. Tolbert, II, Lynn Haven, FL (US)

( * ) Notice: Subject to any disclaimer, the term of this patent is extended or adjusted under 35 U.S.C. 154(b) by 588 days.

(21) Appl. No.: 12/496,978

(22) Filed: Jul. 2, 2009

(51) Int. Cl.
*A47C 7/62* (2006.01)
*A47C 31/00* (2006.01)

(52) U.S. Cl. ............... 297/217.7; 297/463.1; 297/463.2; 297/143

(58) Field of Classification Search ............... 297/463.1, 297/463.2, 217.1, 217.7, 344.12, 344.18, 297/143; 296/64
See application file for complete search history.

(56) References Cited

U.S. PATENT DOCUMENTS

| | | | |
|---|---|---|---|
| 2,333,734 A | | 11/1943 | Nieltopp |
| 2,517,936 A | * | 8/1950 | Spikes ....................... 297/241 X |
| 3,469,810 A | | 9/1969 | Dorris |
| 4,676,547 A | | 6/1987 | Spillman |
| 4,709,649 A | * | 12/1987 | Wann ....................... 114/363 X |
| 5,188,424 A | | 2/1993 | Herron |
| 6,062,638 A | | 5/2000 | Ferguson |
| 6,203,103 B1 | | 3/2001 | Presson |
| 6,808,231 B1 | * | 10/2004 | Hill ....................... 297/217.7 X |
| 6,932,021 B1 | | 8/2005 | Martini |
| 7,396,083 B2 | | 7/2008 | Kasner |

* cited by examiner

*Primary Examiner* — Anthony D Barfield
(74) *Attorney, Agent, or Firm* — Garvey, Smith, Nehrbass & North, L.L.C.; Gregory C. Smith; Julia M. FitzPatrick

(57) ABSTRACT

A device for being secured onto a rail of a pier to allow a fisherman to be seated on the device at a height so that he is able to cast easily above the rail, which includes a flat base which rests on the pier floor, a pair of wheels secured to the base to all the device to be rolled into position; an upright vertical post, having a first lower portion extending upward from the base and a second upper portion which telescopes out from the end of the first lower portion to a predetermined height, the upper portion terminating in a flat surface upon which a cushion or other seat can be placed; a handle member secured to the upper flat surface in order to roll the device into position; an arm member extending substantially horizontally outward from the lower section of the vertical post, which is height adjustable on a first end secured to the vertical post, and extends outward to a second portion which telescopes out from the first portion so that the device can be positioned a predetermined distance from the pier railing; a clamp on the distal end of the second portion for securing to a portion of the pier rail so that the device is maintained upright while the fisherman is seated thereupon.

19 Claims, 4 Drawing Sheets

MOUNTABLE FISHERMAN'S CHAIR

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to fishing devices. More particularly, the present invention relates to a chair apparatus which can be rolled onto a pier or boat, and is capable of being secured to a pier railing or boat gunnel, and is height adjustable, so that a fisherman is able to sit on the seat portion of the device and be at a level above the height of the pier railing or boat wall to conduct fishing operations.

2. General Background of the Invention

In the art of fishing, one of the most common type of fishing is done off of a pier, of the type which usually includes railings on each side so as to prevent entry into the water. The problem which is encountered is that the railings are usually at least three or four feet high, which makes it very difficult for a person to be seated, for example, in a lawn chair which requires one to cast above one's head in order to cast over the rail into the water. This is very uncomfortable and does not lend itself to ease in fishing from a pier. Likewise, even when one is fishing from a boat, oftentimes, the boat wall reaches a height above where one may be seated in the boat, and the same problem is encountered. Therefore, there is a need for a device to overcome this awkward condition when fishing in such circumstances.

The following U.S. Patents are incorporated herein by reference:

TABLE

| U.S. Pat. No. | TITLE | ISSUE DATE |
| --- | --- | --- |
| 2,333,734 | Collapsible Seat | Nov. 9, 1943 |
| 3,469,810 | Beam Clamp | Sep. 30, 1969 |
| 4,767,547 | Portable Spectator's Stool | Jun. 30, 1987 |
| 5,188,424 | Portable Seat | Feb. 23, 1993 |
| 6,062,638 | Portable Stool | May 16, 2000 |
| 6,203,103 | Collapsible Fishing Chair with Detachable Floats | Mar. 20, 2001 |
| 6,932,021 | Dock Swivel Step | Aug. 23, 2005 |
| 7,396,083 | Single-legged Body Support System | Jul. 8, 2008 |

BRIEF SUMMARY OF THE INVENTION

The apparatus of the present invention solves the problems in the art in a simple and straightforward manner. What is provided is a device for being secured onto a rail of a pier to allow a fisherman to be seated on the device at a height so that he is able to cast easily above the rail. The device includes a flat base which rests on the pier floor, a pair of wheels secured to the base to all the device to be rolled into position; an upright vertical post, having a first lower portion extending upward from the base and a second upper portion which telescopes out from the end of the first lower portion to a predetermined height, the upper portion terminating in a flat surface upon which a cushion or other seat can be placed; a handle member secured to the upper flat surface in order to roll the device into position; a second post member extending substantially horizontally outward from the lower section of the vertical post, which is height adjustable on a first end secured to the vertical post, and extends outward to a second portion which telescopes out from the first portion so that the device can be positioned a predetermined distance from the pier railing; a clamp on the distal end of the second portion for securing to a portion of the pier rail so that the device is maintained upright while the fisherman is seated thereupon.

Therefore, it is a principal object of the present invention to provide a fisherman's chair which is able to be height adjustable, and rest on the floor of the pier and engaged to a pier railing for support, while a fisherman is seated on the device.

It is a further principal object of the present invention to provide a fisherman's chair which is able to rolled into position on a pier, a seat portion secured to the end of a vertical post, capable of being adjusted to a certain height, an arm extending outward from the vertical post, and adjustable to allow the device to be a predetermined distance from the pier railing when a fisherman is seated and casting from the device.

It is a further object of the present invention to provide a fishermans' chair which can be rolled into position on a beach, and the vertical post has a sharp lower end which could be driven into the sand a sufficient depth to support the chair upright when a fisherman is seated and casting from the device.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
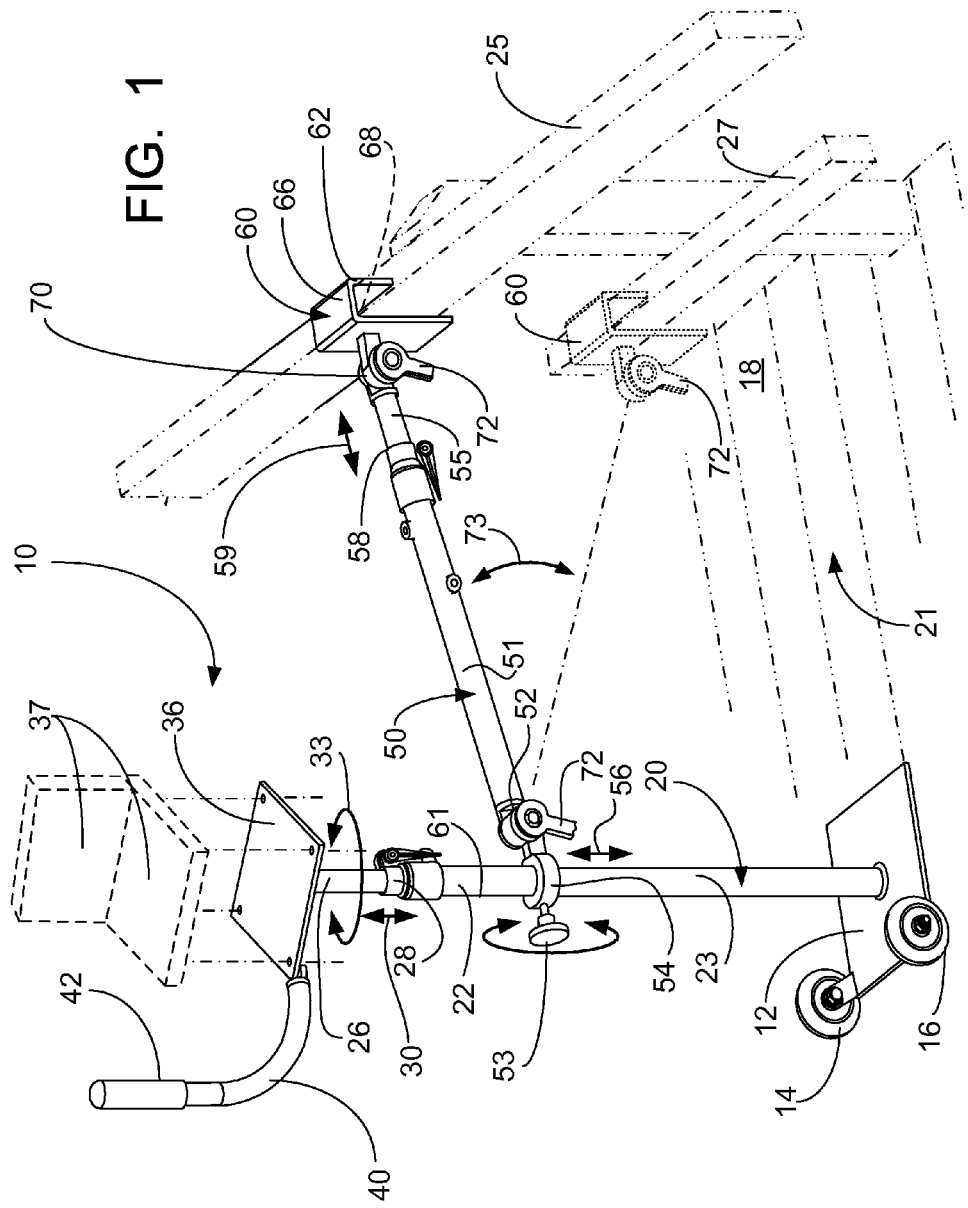
FIG. 1 illustrates an overall view of the preferred embodiment of fisherman's chair device capable of being secured to a railing of a fishing pier.

FIGS. 1 through 5 illustrate the preferred embodiment of the fisherman's chair device of the present invention by the numeral 10. As seen in overall view in FIG. 1, the chair device 10 includes a flat, substantially rectangular base member 12, having a pair of wheels 14, 16 which rotate freely and allow the chair device 10 to be wheeled into position onto the floor surface 18 of a pier 21 (FIG. 1), or bridge beam 110 (FIGS. 2 and 3) or boat 121 (FIG. 4), as the case may be. As seen in FIG. 1, once in position, the lower surface 19 of the base member 12 rests on the floor surface 18 of pier 21. There is further illustrated a vertical post 20, having a first lower portion 22, the lower end 24 of which is permanently secured through welding or the like, to the base member 12. Vertical post 20 has a second upper portion 26 which has the ability to telescope in and out from the distal end 28 of vertical post 20, as seen by Arrow 30 in FIG. 1, to a predetermined height. Once the height is achieved, there is provided a clamp 32 which when tightened secures the upper portion 26 in the position within lower portion 22 until the clamp 32 is disengaged. Further, when clamp 32 is disengaged, the upper portion 26 of post 20 may rotate to any position in a 360 degree direction as seen by Arrow 33 in FIG. 1. Clamp 32 would be engaged when the seat is at the proper height and direction.

As seen further, the upper end 24 of upper portion 26 of vertical post 20 there is engaged a flat, substantially rectangular seat base 36, having an upper surface 38 upon which may be set a seat or cushion member 37, as the fisherman so desires, for greater comfort. Further, there is provided a handle member 40 which extends outward and upward from seat base 36, terminating in a grip 42, so that the handle 40 can be used to guide the device 10 as it is rolled into position for fishing.

Turning now to another feature of the device, again reference is made to FIG. 1, wherein there is shown an arm member 50, having a first portion 51 extending substantially horizontally from and engaged to the lower portion 22 of vertical post 20. Arm member 50 has a second portion 55 which telescopes in and out of the distal end 58 of first portion 51, as seen by Arrow 59 to a desired distance as will be explained. The first end 52 of arm member 50 includes a circular clamp 54 engaged around the circular wall 23 of lower portion 22. The clamp member is of the type having a knob 53 which can be engaged and disengaged against the wall 23 during use. This feature allows the arm member 50 to be moved to any point along the wall 23 of lower portion 22, in the direction of Arrow 56, so that when the desired height is achieved, the knob 53 is tightened against the wall 23 of lower portion 22 to maintain the arm member 50 at the desired height. It should be noted that the wall 23 of lower portion 22 of post 20 may include a plurality of protruding teeth 60 so that when the knob 53 is engaged, it would be engaged in a space defined by the teeth, so as to assure the arm member 50 maintains secure and in place. Likewise, the first end 52 of arm member 50 includes a swivel 70 and thumb screw member 72 at the connection of the circular clamp 54 to the first end 52 of the arm member 50, which allows the arm member 50 to pivot up and down, as needed, in the direction of Arrow 73, so that one may fix the arm to an upper beam railing 25 or a lower beam railing 27, when the clamp is in the proper position, the screw 72 is tightened to maintain the arm member 50 in the desired position.

Turning now to the second portion 55 which telescopes out from the distal end 58 of the first portion 51 of arm member 50, there is provided a clamp 60, which as seen in FIG. 1, has a pair of wall portions 62 and 64, secured to a top portion 66, and spaced apart to define an opening 68 therebetween. In use, once the user determines the distance the device 10 is to be set from the upper or lower rail s 25, 27 of the pier 21, the clamp 60 is engaged around the top or side of the rail and set in place. As with the first end 52 of arm member 50, the distal end 58 likewise includes a swivel 70 thumb screw member 72 at the connection of the end 58 to the clamp 60, which allows the clamp 60 to be inclined or declined as needed, in the direction of Arrow 73, so that when the clamp is in the proper position, the screw 72 is tightened to maintain the clamp 60 in the desired position.

Figure 2:
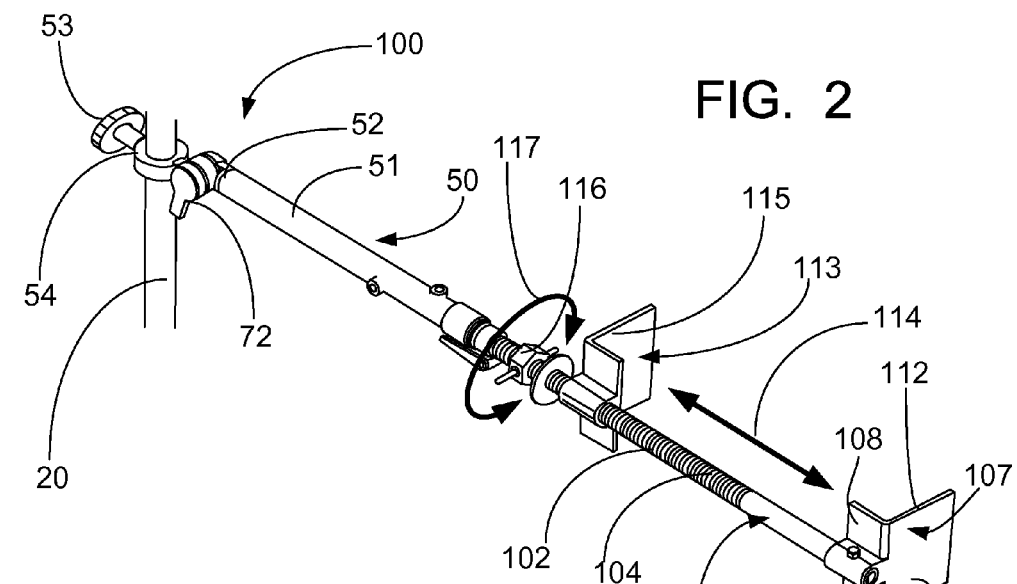
FIGS. 2 and 3 illustrate isolated views of the preferred embodiment of the fisherman's chair device capable of being secured to a beam of a bridge.
Figure 3:
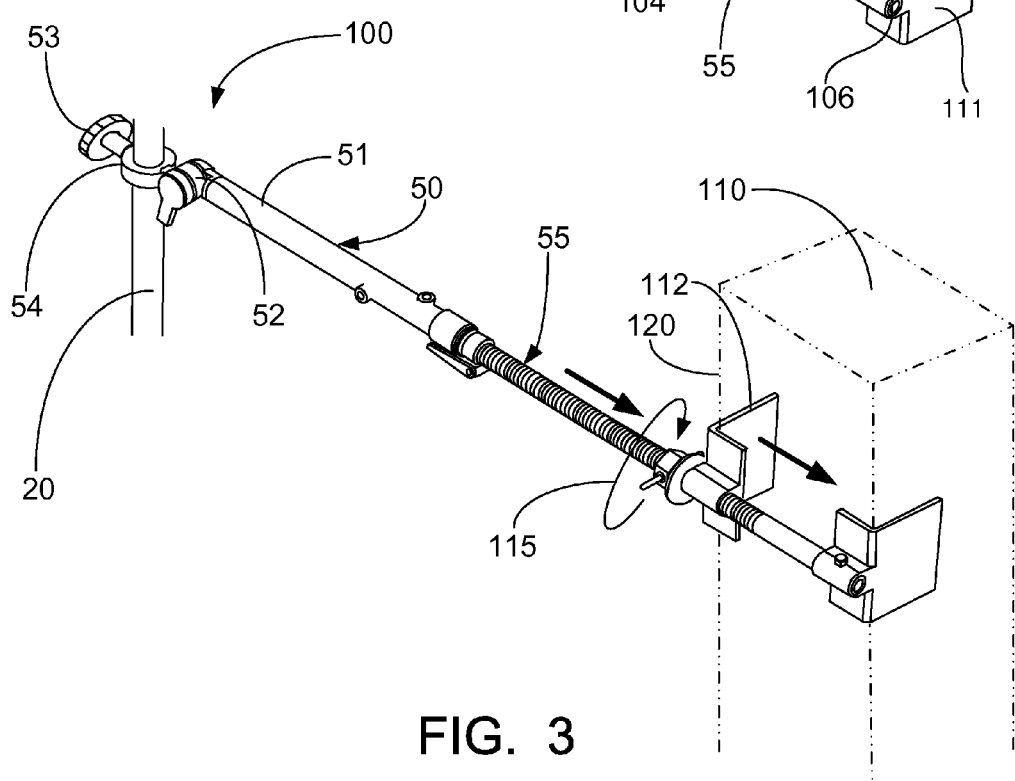

FIGS. 2 and 3 illustrate a second preferred embodiment of the fisherman chair device 100 of the present invention. This embodiment of the device would be designed to be secured to the rail or beam 110 of a bridge, as illustrated. For sake of avoiding repetition, all of the features of the second embodiment of device 100 are identical to the features of the device 10 as explained in reference to FIG. 1, except for the features that will be more fully explained below.

In FIGS. 2 and 3, fisherman chair device 100 is modified from device 10 shown in FIG. 1, in terms of how it relates to the manner in which this device 100 is secured to a railing or beam 110 of a bridge. The horizontal arm 50 has been modified in that the second portion 55 of arm 50 telescopes out from first portion 52, but, second portion 55 includes a threaded wall portion 102 having a continuous thread 104 extending along a substantial portion of its length. At the distal end 106 of portion 102 there is provided a plate 107, shaped in an "L" configuration having a first portion 108 engaged to the end 106 of portion 102, and a face portion 111 secured to and at a right angle from first portion 108, defining an inner face 112 which will engage against a beam 110 of a bridge. There is a second "L" shaped plate 113 slidably moveable along the threaded portion 102 of second portion 55, which allows it to be slid in and out along portion 102, in the direction of Arrow 117, and held in position by the threading of nut 116 on thread 104. Plate 113 is configured identical to plate 107 and also defines a face 115 which engages against an opposing wall 120 of beam 110. When the plates are set against beam 110, the nut 116 is tightened into position (Arrow 117) against plate 113, and the arm 50 is secured in place, which, of course, secures the device 100 into position.

Figure 4:
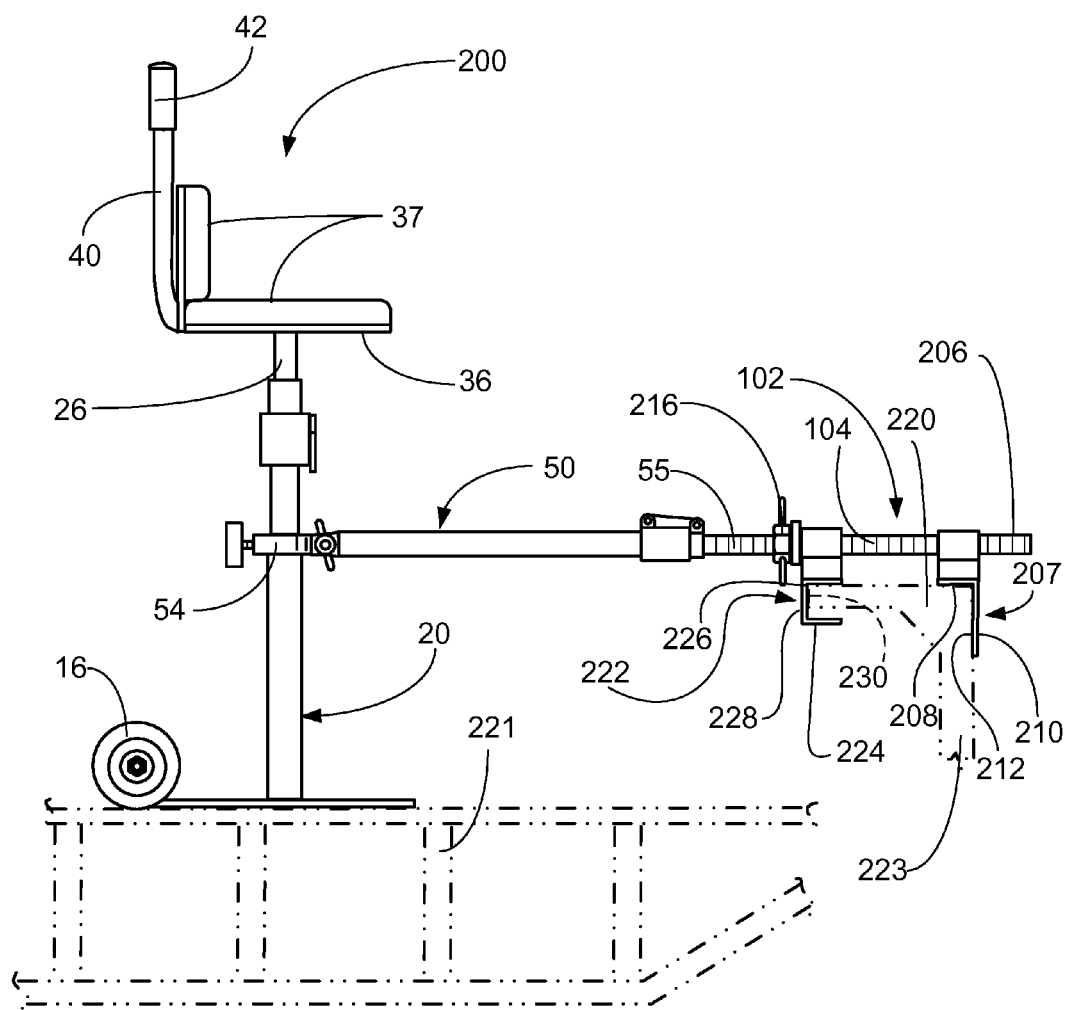
FIG. 4 illustrates a side view of the preferred embodiment of the fisherman's chair device capable of being secured to a wall or gunnel of a boat.

Turning now to the third principal embodiment shown in FIG. 4, fisherman chair device 200 is modified from device 100 shown in FIG. 2, very slightly, to allow it to be secured to the wall or gunnel 220 of a boat 221. As was stated earlier in regard to the embodiment in FIGS. 2 and 3, the horizontal arm 50 has been modified in that the second portion 55 of arm 50 telescopes out from first portion 52, but, second portion 55 includes a threaded wall portion 102 having a continuous thread 104 extending along a substantial portion of its length. At the distal end 106 of portion 55 there is provided a plate 207, shaped in an "L" configuration having a first portion 208 engaged to the end 206 of portion 55, and a face portion 210 secured to and at a right angle from first portion 208, defining an inner face 212 which will engage against the wall 223 of the boat. In the embodiment shown in FIG. 4, the second member could be defined as a clamp 222 and is shaped similar to the clamp 60 described in regard to FIG. 1. That is, clamp 222, which is similar, if not identical to clamp 60 seen in FIG. 1, includes a pair of wall portions 224 and 226, secured to a top portion 228, and spaced apart to define an opening 230 therebetween. Therefore, when plate 207 is set against the wall 223 of a boat 221, the nut 216, on threaded portion 102 is tightened into position against clamp 222, which in turn engages the gunnel 220 of the wall 223 of the boat 221, and the arm 50 is secured in place, which, of course, secures the device 200 into position.

Figure 5:
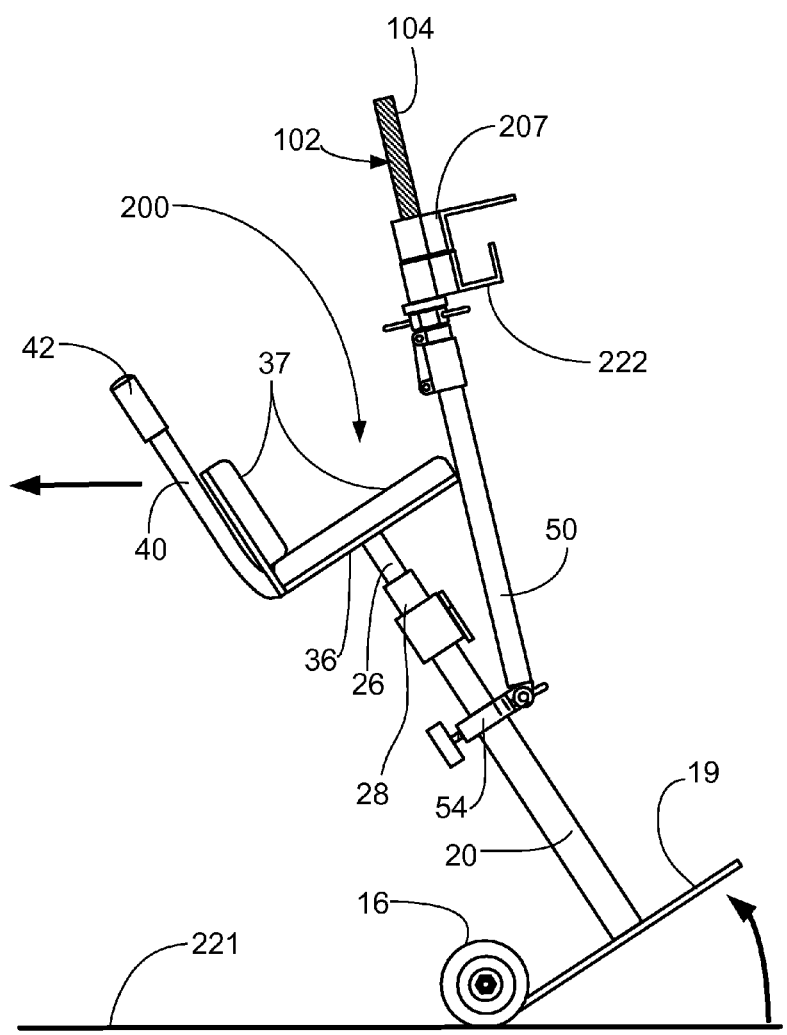
FIG. 5 illustrates a side view of the preferred embodiment of the fisherman's chair device as it would be rolled onto or off of the fishing location.

In FIG. 5, the device 10 is illustrated in the embodiment which would be set upon a boat 221. Of course, the movement of the device in any of the embodiments would be in the same manner as will be explained below. As seen the device 10 or 100 or 200 would be tilted back by the use of handle member 40, so that it could be rolled on wheels 14, 16. As seen, during transport, the arm member 50 has been secured in its highest position, so that the device 10 can be more easily maneuvered than if the arm 50 were extended outward. Once it is moved into place, the arm 50 would be lowered to the desired height and distance from vertical post 20, and as explained in regard to the three embodiments, the clamps would be tightened so that the device is secured in place for the fisherman.

It is foreseen that the device as disclosed above could be modified so that the base 12 could be removed, and the lower end of post 20 would be sharp and pointed so that the device or chair could be rolled out onto a beach and the point end could be set into the sand a sufficient depth to allow the chair to remain upright and support a fisherman thereupon.

In each of the embodiments discussed in FIGS. 1 through 5, it is foreseen that there is an alternative embodiment in which the device is attached to a pier or a beam of a bridge or to the gunnel of a boat, or any other structure. The device could be altered to allow the end of the arm 50 extending out from the vertical post 20 so that there is a pair straps, having industrial strength hook and fasteners, of the type material registered as Velcro®, a trademark owned by Velcro Industries. The straps would simply extend outward from the end of the arm 50 and have sufficient length to be wrapped around the pier or beam or other structure to hold the chair secured to the structure, without the use of the types of clamps described and shown.

The following is a list of parts and materials suitable for use in the present invention.

PARTS LIST

| Part Number | Description |
|---|---|
| 10 | chair device |
| 12 | rectangular base member |
| 14, 16 | wheels |
| 18 | floor surface |
| 19 | lower surface |
| 20 | vertical post |
| 21 | pier |
| 22 | lower portion |
| 23 | circular wall |
| 24 | lower end |
| 25 | upper pier railing |
| 26 | second upper portion |
| 27 | lower pier railing |
| 28 | distal end |
| 30 | Arrow |
| 32 | clamp |
| 33 | Arrow |
| 36 | rectangular seat base |
| 37 | seat cushion |
| 38 | upper surface |
| 40 | handle member |
| 42 | grip |
| 50 | arm member |
| 51 | first portion |
| 52 | first end |
| 53 | knob |
| 54 | circular clamp |
| 55 | second portion |
| 56 | Arrow |
| 58 | distal end |
| 59 | Arrow |
| 60 | clamp |
| 61 | teeth |
| 62, 64 | wall portions |
| 66 | top portion |
| 68 | opening |
| 70 | swivel |
| 72 | thumb screw |
| 73 | Arrow |
| 100 | chair device |
| 102 | threaded wall portion |
| 104 | continuous end |
| 106 | distal end |
| 107 | plate |
| 108 | first portion |
| 110 | bridge beam |

PARTS LIST -continued

| Part Number | Description |
|---|---|
| 110 | face portion |
| 112 | inner face |
| 113 | L shaped plate |
| 114 | Arrow |
| 115 | face |
| 116 | nut |
| 117 | Arrow |
| 120 | opposing wall |
| 122 | clamp |
| 200 | chair device |
| 206 | end |
| 207 | plate |
| 208 | first portion |
| 210 | face portion |
| 212 | inner face |
| 216 | nut |
| 220 | gunnel |
| 221 | boat |
| 222 | clamp |
| 223 | wall |
| 224, 226 | wall portions |
| 228 | top portion |
| 230 | opening |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A fisherman's chair, mountable on a substantially flat surface, comprising:
 a. a vertical post portion;
 b. a flat base resting on the surface, upon which a lower end of the vertical post portion is secured;
 c. a seat portion on an upper end of the vertical post portion;
 d. an arm extending out from the vertical post portion;
 e. a clamp means at the end of the arm, capable of securing the chair to a stable structure to secure the chair to the structure as a fisherman sits on the seat of the chair and fishes, said means comprising:
  i. a first portion of the clamp means affixed to the adjustable arm member;
  ii. a second portion of the clamp means moveable along a threaded portion of the arm; and
  iii. a nut threaded onto the threaded portion of the arm for forcing the second portion of the clamp means to engage against a wall of the structure so that the first and second portions of the clamp means are engaged tightly against opposing walls of the structure to secure the chair in place as a fisherman fishes while seated on the seat of the chair.

2. The fisherman's chair in claim 1, wherein the stable structure to which the clamp is secured comprises a railing of a pier, or a beam of a bridge, or a gunnel of a boat.

3. The fisherman's chair in claim 1, further comprising wheels at the base of the chair for rolling the chair to and from the flat surface.

4. The fisherman's chair in claim 1, wherein the vertical post portion further comprises an upper portion which telescopes out from an upper end of the vertical post portion to allow it to be height adjustable.

5. The fisherman's chair in claim 1, wherein the means for securing the chair to a stable structure comprises a second clamp to render the upper portion of the vertical post portion to become immovable when the clamp is engaged.

6. The fisherman's chair in claim 1, wherein the arm portion further comprises a second portion which telescopes out from a distal end of the arm portion to allow the chair to be set a certain distance from the stable structure to which it is engaged.

7. The fisherman's chair in claim 1, wherein the means for securing the chair to a stable structure comprises a length of hook and eye material extending from an end of the arm portion to engage the stable structure to render the upper portion of the vertical post portion to become immovable when the clamp means is engaged.

8. The fisherman's chair in claim 1, wherein the seat portion can accommodate a pad or other type of seat cushion atop the seat portion.

9. The fisherman's chair in claim 1, wherein the arm member further comprises the clamp means capable of engaging a beam of a bridge when the chair is set upon a bridge surface, or a boat gunnel.

10. The fisherman's chair in claim 1, wherein the arm member further comprises the clamp means capable of engaging a gunnel of a boat when the chair is set upon a floor of a boat.

11. A fisherman's chair, mountable on a surface having a railing, comprising:
   a. a height adjustable vertical post portion;
   b. a flat base resting on the surface, upon which a lower end of the vertical post portion is secured;
   c. a seat portion on an upper end of the height adjustable vertical post portion;
   d. an adjustable arm member extending out from the vertical post portion;
   e. an adjustable clamp at the end of the arm member, the clamp further comprising:
      i. a first portion of the clamp affixed to the adjustable arm member;
      ii. a second portion of the clamp moveable along a threaded portion of the arm; and
      iii. a nut threaded onto the threaded portion of the arm for forcing the second portion of the clamp to engage against a wall of a beam so that the first and second portions of the clamp are engaged tightly against opposing walls of the beam to secure the chair in place as a fisherman fishes while seated on the seat of the chair.

12. The fisherman's chair in claim 11, further comprising a pair of wheels on the base of the chair, and a handle secured to the seat of the chair so that the chair can be rolled into and out of position as required.

13. A fisherman's chair, mountable on a surface adjacent a beam, comprising:
   a. a height adjustable vertical post portion;
   b. a flat base resting on the surface, upon which a lower end of the vertical post portion is secured;
   c. a seat portion on an upper end of the height adjustable vertical post portion;
   d. an adjustable arm member extending out from the vertical post portion to the beam;
   e. an adjustable clamp at the end of the arm member, the clamp further comprising:
      i. a first portion of the clamp affixed to the adjustable arm member;
      ii. a second portion of the clamp moveable along a threaded portion of the arm; and
      iii. a nut threaded onto the threaded portion of the arm for forcing the second portion of the clamp to engage against a wall of the beam so that the first and second portions of the clamp are engaged tightly against opposing walls of the beam to secure the chair in place as a fisherman fishes while seated on the seat of the chair.

14. The fisherman's chair in claim 13, further comprising wheels at the base of the chair for rolling the chair to and from the bridge.

15. The fisherman's chair in claim 13, wherein the vertical post portion further comprises an upper portion which telescopes out from an upper end of the vertical post portion to allow it to be height adjustable.

16. The fisherman's claim in claim 13, further comprising a second clamp to render the upper portion of the vertical post portion to become immovable when the clamp is engaged.

17. The fisherman's chair in claim 13, wherein the arm portion further comprises a second portion which telescopes out from a distal end of the arm portion to allow the chair to be set a certain distance from the pier to which it is engaged.

18. The fisherman's chair in claim 13, further comprising a second clamp to render the second portion of the arm portion to become immovable when the clamp is engaged.

19. A fisherman's chair, mountable on a boat adjacent a gunnel of the boat, comprising:
   a. a height adjustable vertical post portion;
   b. a flat base resting on the surface, upon which a lower end of the vertical post portion is secured;
   c. a seat portion on an upper end of the height adjustable vertical post portion;
   d. an adjustable arm member extending out from the vertical post portion to the gunnel;
   e. an adjustable clamp at the end of the arm member, the clamp further comprising:
      i. a first portion of the clamp affixed to an end of the adjustable arm member;
      ii. a second portion of the clamp moveable along a threaded portion of the adjustable arm; and
      iii. a nut threaded onto the threaded portion of the arm for forcing the second portion of the clamp to engage against a wall of the boat and the second portion engaging the boat gunnel, so that the first and second portions of the clamp are engaged tightly against opposing walls the gunnel and wall of the boat to secure the chair in place as a fisherman fishes while seated on the seat of the chair.

* * * * *